Oct. 21, 1924.  1,512,822

R. DAERING

MACHINE FOR BURNING WEEDS AND THE LIKE

Filed Oct. 25, 1922  2 Sheets-Sheet 1

INVENTOR
RUDOLF. DAERING.

BY Fetherstonhaugh
ATT'YS.

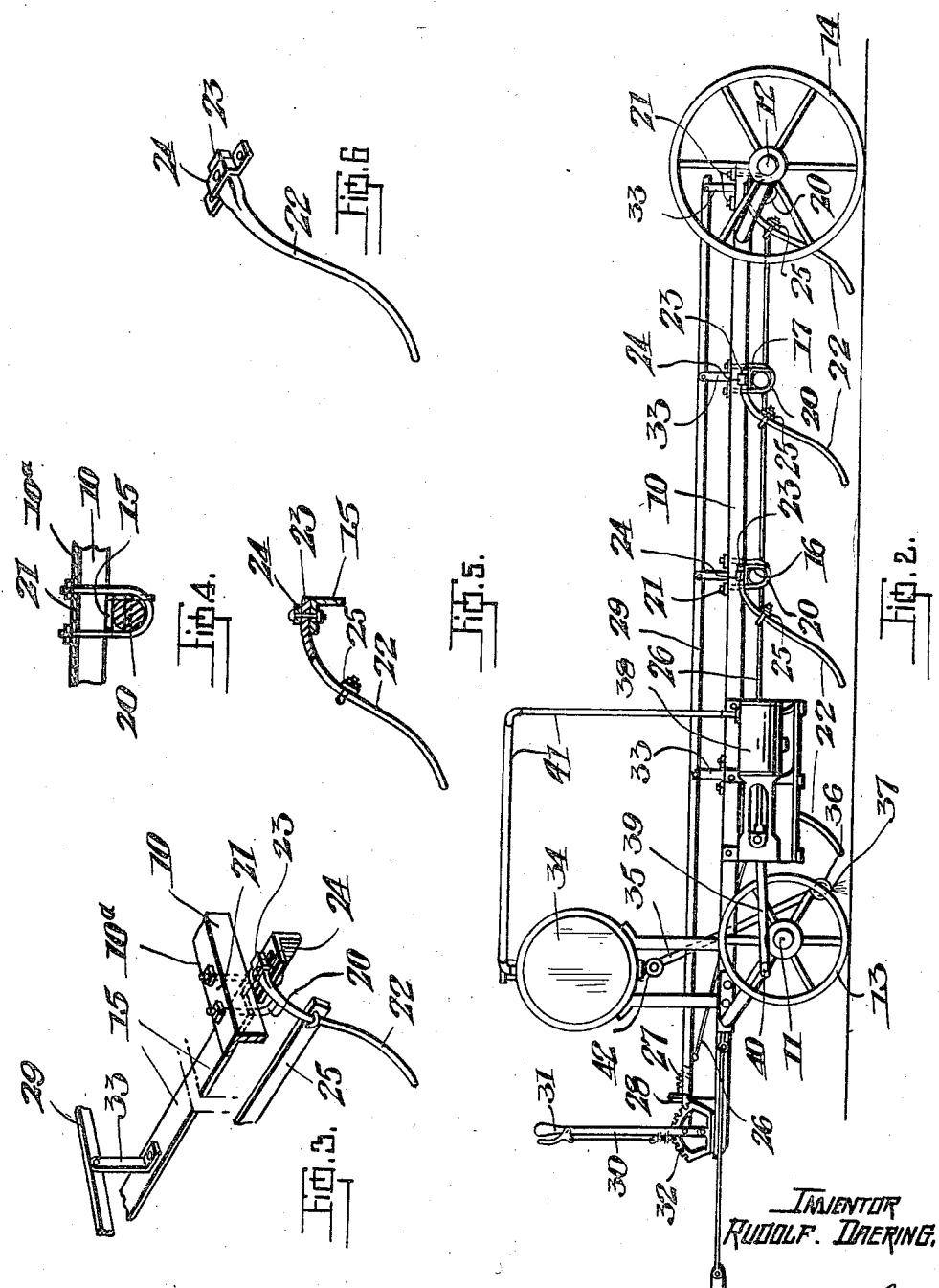

Patented Oct. 21, 1924.

1,512,822

UNITED STATES PATENT OFFICE.

RUDOLF DAERING, OF GROS VENTRE, ALBERTA, CANADA.

MACHINE FOR BURNING WEEDS AND THE LIKE.

Application filed October 25, 1922. Serial No. 596,805.

*To all whom it may concern:*

Be it known that I, RUDOLF DAERING, a subject of the King of Great Britain, and a resident of Gros Ventre, in the Province of Alberta and Dominion of Canada, have invented certain new and useful Improvements in Machines for Burning Weeds and the like, of which the following is a specification.

This invention relates to improvements in machines for burning weeds and the like, such as stubble as well as insects such as locusts, grasshoppers and otherwise; and the objects of the invention are to provide a simple and economically constructed machine of this kind in which the several parts will efficiently perform all the functions required of them.

With these and other objects in view, the invention consists essentially in the novel construction and arrangement of parts as described in the present specification and illustrated by the accompanying drawings that form part of the same.

Referring to the drawings, in which like characters of reference indicate corresponding parts in each figure, and in which:

Figure 2 is a side elevation.

Figure 3 is a perspective detail, partly in section showing the connection between the teeth and the supports and the pivotal mounting of the supports on the frame.

Figure 4 is a cross-section of the mounting of the teeth supports on the frame.

Figure 5 is a side elevation of a tooth, partly sectional.

Figure 6 is a perspective detail of a tooth and the means of fastening the same on the supports.

In the drawings:

Figure 1:
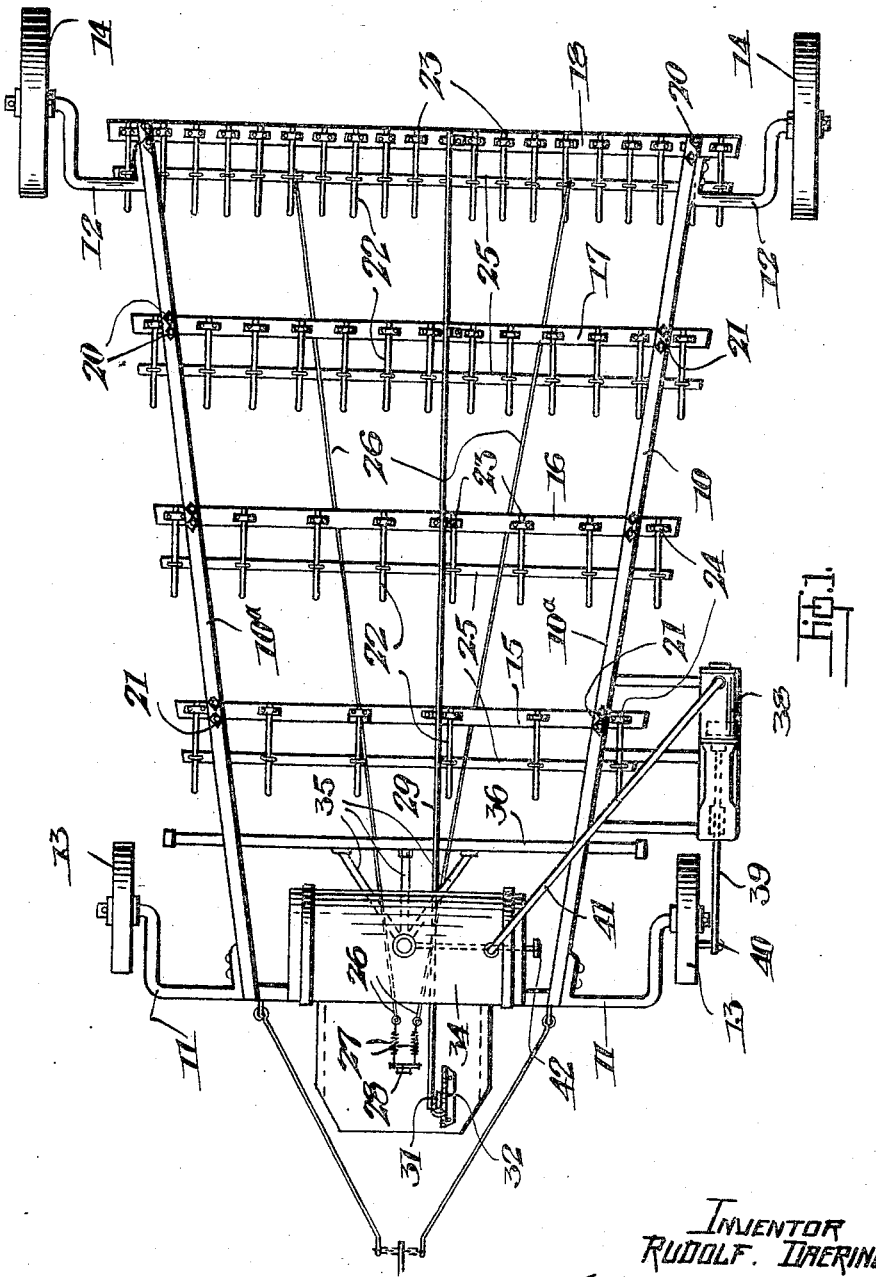
Figure 1 is a plan view of the machine as a whole.

Referring to Figures 1 and 2, 10 is the frame of the machine tapered from the rear towards the front, made of any suitable material such as angle iron. 11 and 12 are front and rear axles for the frame 10 suitably bent and provided with front and rear wheels 13 and 14 whereby the machine is transported either by being hitched to a horse, a wagon or by any other suitable means. Mounted on the frame 10 at suitably spaced intervals in the length thereof are the transversely extending double supports 15, 16, 17 and 18. These members are pivotally mounted on the sides 10ᵃ of the frame 10 by means of U-shaped clamps 20 suitably bolted to said frame at 21.

22 designates a plurality or series of teeth mounted on each of the supporting members above referred to, these teeth being formed with square heads 23 and suitably bent towards the bottom. The square heads are clamped by U-shaped clamps 24 on the main supporting member while they are operatively held in position by means of straps 25 on the auxiliary supporting member.

26 are rods or cables provided with springs 27 connected to the front bar 28 and designed to hold the teeth in place even when coming in contact with bumps, rocks or other obstacles. The supporting members 15, 16, 17 and 18 being pivotally mounted on the frame are adapted to raise or lower the teeth thereon by means of the rod 29 operated from the front of the machine through a hand lever 30 having a handle 31 and adapted to engage with a ratchet member 32, these lever members being individually connected to the teeth supporting members by angle iron pieces 33.

From the foregoing, it will be seen that the machine is adapted to move by means of the bent axles comparatively close to the ground and that, being considerably wider at the rear than it is at the front, it will cover an extended portion of the ground in each swathe. Moreover, the rows of operatively mounted teeth at spaced distances from one another in staggered relationship on the machine will enable it to thoroughly rake the ground to be covered.

In connection with this system of raking the ground, I provide in combination therewith, means for destroying the weeds or otherwise collected by the teeth, and these means comprising a tank 34 suitably mounted in the front of the machine and connected to this tank by a plurality of pipes 35 is a transversely extending burner pipe 36 provided with a plurality of orifices 37 therein through which the oil is delivered under pressure, to be there ignited and to form by means of said pressure, an all-consuming flame in the form of a spray or the like to sweep the rows of teeth.

To provide this pressure for the oil tank, I use an air pump 38 suitably mounted on the side of the machine, the arm 39 of which is connected to the front wheel at 40 so that, on the machine moving, the pump is operated to supply air through the pipe 41 into the oil tank 34. 42 is the oil control valve.

From the foregoing, it will be seen that I have invented a simple and effective means for destroying weeds, stubble, insects and the like on land, particularly on farming land.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A machine for burning weeds and the like comprising a V-shaped frame mounted on wheels, a plurality of transversely supporting members pivotally mounted and spaced from one another on said frame, rows of spaced teeth on said supporting members, the teeth of each row being arranged in staggered relationship to the teeth of adjacent row, means for raising and lowering said rows of teeth, means for consuming the material raked up by the teeth comprising a fuel tank carried by the frame having a plurality of pipes communicating with a burner pipe transversely arranged across said frame, means for supplying pressure to the tank comprising an air pump pipe-connected to the tank and having its handle connected to one of the frame wheels whereby the pump is operated to pump air into the fuel tank.

2. A machine of the character described comprising a frame, a plurality of pivotally mounted raking members arranged in staggered relationship to one another on said frame, burner means for said members including a transversely extending apertured pipe, fuel tank means for the burner means and means for supplying pressure to the fuel tank comprising an air pump adapted to be operated by the wheels of the machine.

In witness whereof I have hereunto set my hand in the presence of two witnesses.

RUDOLF DAERING.

Witnesses:
  WILFRED PENNINGTON,
  ALEX MACGREGOR.